UNITED STATES PATENT OFFICE.

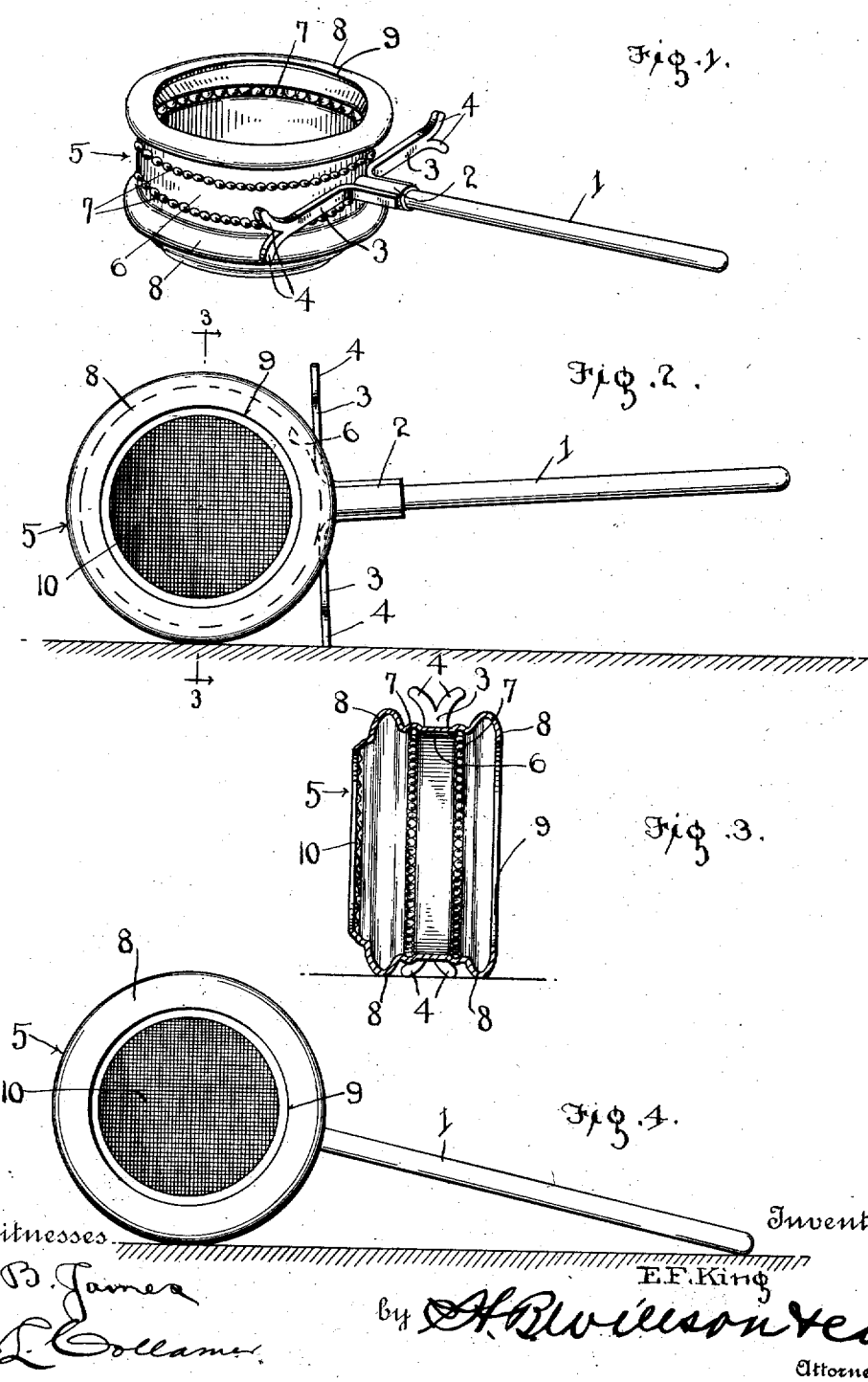

EDWARD FRANCIS KING, OF ATTLEBORO, MASSACHUSETTS.

DRIPLESS TEA-STRAINER.

1,019,967.      Specification of Letters Patent.      Patented Mar. 12, 1912.

Application filed July 27, 1911. Serial No. 640,793.

*To all whom it may concern:*

Be it known that I, EDWARD FRANCIS KING, a citizen of the United States, residing at Attleboro, in the county of Bristol and State of Massachusetts, have invented certain new and useful Improvements in Dripless Tea-Strainers; and I do declare the following to be a full, clear, and exact description of the invention, such as will enable others skilled in the art to which it appertains to make and use the same.

This invention relates to table and kitchen articles, and more especially to strainers such as are used upon the table when tea and sometimes coffee is to be poured from the pot into the cup; and the object of the same is to produce such a strainer which after use may be laid upon the finest table linen and the same will not be soiled by drippings or by tea leaves or coffee grounds. This object is accomplished by the construction hereinafter more fully described and claimed, and as shown in the drawings wherein—

Figure 1 is a perspective view showing this strainer in position for use. Fig. 2 is a section through the table top, showing this improved strainer out of use and resting thereon in a position which it should occupy when no drippings or leaves or grounds are to reach the linen. Fig. 3 is a cross section on the line 3—3 of Fig. 2, looking toward the feet, illustrating the stamped construction of the bowl. Fig. 4 is a section through a table top showing a simpler form of this device with one side of the bowl and the outer end of the handle resting thereon.

In the drawings this improved strainer is shown as comprising a bowl, a handle, and feet, and by preference the bowl and feet and perhaps the ferrule are made of metal and in one piece if possible, while the handle may well be made of wood or other non-conductor of heat or perhaps of ivory or also of metal, and suitably ornamented to be consistent with the entire device. It may be said in starting that the construction of the handle is immaterial to the successful operation of this improved strainer, and it is not necessarily rigidly connected therewith or necessarily detachable therefrom.

In the drawings I have numbered the handle 1, and shown it as inserted into a ferrule or socket 2 which stands between two oppositely disposed legs 3 which carry feet 4 at their outer ends as shown. The bowl 5 is by preference stamped up from light sheet metal and may be oval or of other suitable shape although I prefer to make it circular and substantially cylindrical. In the drawings its body 6 is shown as flat, and at either side of the same is a fine ornamental bead 7, while outside of the beads 7 are two larger or deeper beads 8 which of course form grooves on the interior of the bowl and ribs on its exterior. The contracted mouth 9 of one of these larger beads 8 forms the mouth of the bowl and is left open so that liquid can be poured thereinto, and the contracted portion of the other bead 8 carries the gauze strainer 10 which may be secured therein permanently or removably as may be desired. The bowl will by preference be made by stamping or spinning metal, and if so the ferrule and the legs might be attached by soldering or riveting or otherwise.

In use the operator pours tea or coffee through the strainer in a manner which will be clear from Fig. 1, and when the cup is filled and the supply cut off it becomes desirable to lay down the strainer without soiling the table linen. This is accomplished by rotating the handle through a quarter revolution which brings the strainer or gauze 10 into a vertical plane and causes the leaves or grounds and liquid yet remaining within the bowl to fall into one or more of the various grooves or beads therein; after which the operator may move the bowl to any point desired and lay it upon the table by resting it upon the then lowermost foot and the adjacent beads as seen in Fig. 2, and permitting the handle to project horizontally as will be clear. Such position of the handle at this time follows from the fact that the length of the legs is such that their feet are spaced a distance apart which is substantially equal to the largest diameter of the bowl, which of course would be across its larger beads 8 if it has them. When desired to use again the handle is grasped and the strainer brought into position for use before it is turned to bring the gauze 10 into a horizontal position which would of course permit the last drippings to run out into the cup yet to be filled. Thus it will be clear that by proper use of this device the table linen need never be soiled because the deep grooves inside the larger beads 8 will catch and retain all the surplus grounds or leaves and liquid until the bowl is again turned into position for use.

The size, proportion, materials and ornamentation of parts are not necessary to the successful operation of the whole, and considerable latitude as to these details will be left to the manufacturer. A simpler type of this device may be made by omitting the legs and feet and possibly also the ferrule as seen in Fig. 4, and of course it is not necessary that the bowl be stamped as it might be cast or molded. In this case, the device when not in use will rest upon one edge of the bowl whose exterior should be of cylindrical contour, and upon the remote end of the handle.

What is claimed as new is:

1. The herein described dripless tea strainer comprising a bowl substantially cylindrical in contour having deep beads formed in its walls near both its ends, one of the latter being open to form the mouth of the bowl, and wire gauze filling the other; a ferrule and legs secured upon one side of said bowl, the legs having feet at their outer ends separated a distance substantially equal to the diameter of the bowl; and a handle of light weight carried by said ferrule.

2. A tea strainer comprising a bowl substantially cylindrical in contour and having deep internal grooves near its ends, a strainer between the outer wall of one groove and closing one end of the cylinder leaving the other end open to form the mouth of the bowl, and a light weight handle projecting radially from the bowl.

In testimony whereof I have hereunto set my hand in presence of two subscribing witnesses.

EDWARD FRANCIS KING.

Witnesses:
HARRY D. BELLIN,
EVELYN SERGY.

Copies of this patent may be obtained for five cents each, by addressing the "Commissioner of Patents, Washington, D. C."